May 2, 1967  R. W. KEYES  3,317,848
NON-RECIPROCAL LIGHT AMPLIFIER
Filed Jan. 20, 1964
FIG. 1
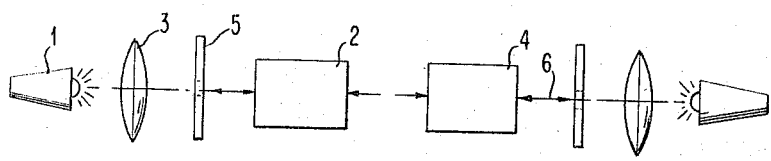
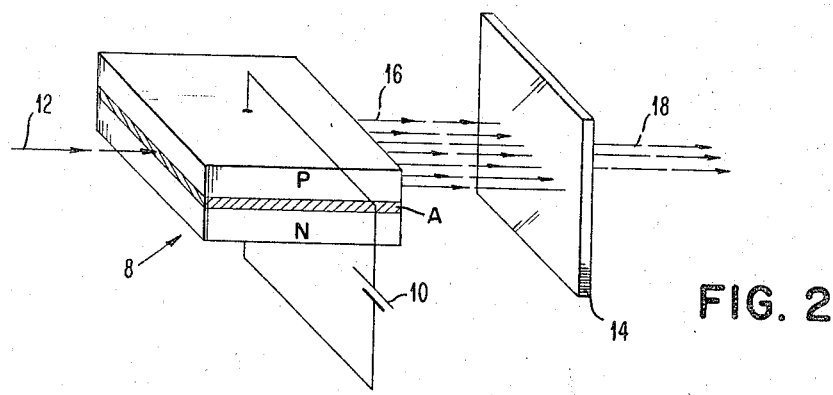
FIG. 2
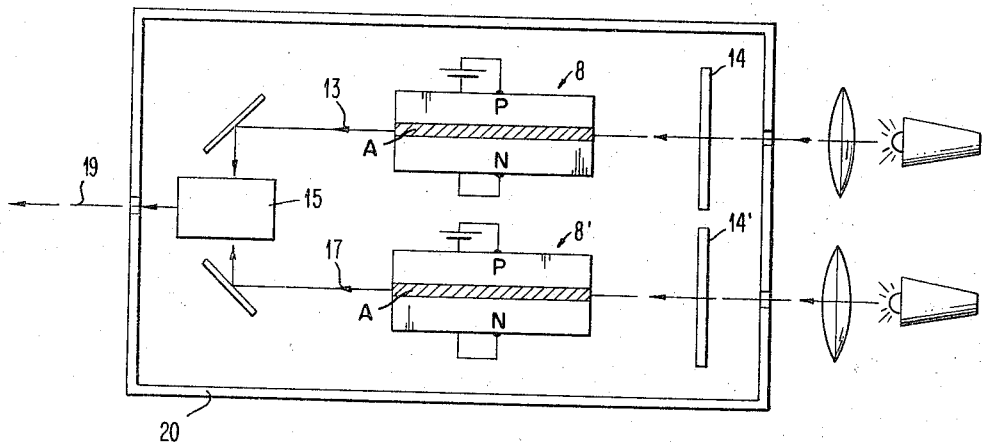
FIG. 3
INVENTOR
ROBERT W. KEYES
BY *George Baron*
ATTORNEY United States Patent Office 3,317,848
Patented May 2, 1967

3,317,848
NON-RECIPROCAL LIGHT AMPLIFIER
Robert W. Keyes, White Plains, N.Y., assignor to International Business Machines Corporation, New York, N.Y., a corporation of New York
Filed Jan. 20, 1964, Ser. No. 338,772
6 Claims. (Cl. 330—4.3)

This invention relates to logic systems and more particularly to logic systems that employ optical devices.

In carrying out logic employing optical devices, it is desirable to employ an optical system where the light through such system is substantially uni-polar. That is, light going through the system from one direction produces an intensity at its output which is significantly greater than the output obtained when light passes through the system from the opposite direction. In effect, what is desired is a light "diode."

The present invention obtains the diode effect by combining a linear amplifier of light with a non-linear absorber or with a non-linear amplifier of light in such a manner that the diode effect is obtained. By non-linear is meant that the transmittance through the medium is dependent upon the intensity of the light incident on the medium; although each of the elements, namely, the linear light amplifier and the non-linear absorber, is separately reciprocal, the combination of such elements is non-reciprocal. Various types of light amplifiers and non-linear absorbers of light will be given hereinafter. However, the objects to be obtained by the novel combination are as follows:

One object is to obtain a non-reciprocal light amplifier.

Yet another object is to obtain a non-reciprical light amplifier particularly useful for performing logic.

It is still another object to combine a linear amplifier with a non-linear absorber so as to obtain the effects of a light diode.

The foregoing and other objects, features and advantages of the invention will be apparent from the following more particular description of preferred embodiments of the invention as illustrated in the accompanying drawing.

In the drawing:

FIGURE 1 is a generalized block diagram of the invention.

FIGURE 2 is an embodiment of the invention as a light diode using a laser as a linear amplifier and a GaAs crystal as a non-linear light absorber.

FIGURE 3 shows an embodiment of the invention employed to perform an AND logic.

In FIGURE 1, box 2 will be any linear amplifier of light and box 4 will be a non-linear absorber of light, that is the optical absorptivity of the element making up box 4 is altered by the light impinging upon it. Such non-linears absorbers of light could be a solid or liquid material whereby, when a high intensity light impinges upon the body, the greater the intensity of the impinging light, the greater the absorptivity of such light.

Assume that I is the intensity of a beam of light 1 that is incident from the left onto linear amplifier 2 through a lens 3 and shutter 5 The amplifier 2 amplifies the light I by a factor M. Thus, the light impinging upon the non-linear absorber 4 from the left will be MI. The non-linear absorber 4 attenuates the light impinging upon it from the left by a factor B(I'), where B is the attenuating factor and I' is the intensity of light incident on 4, in this case, MI. The output intensity I''$_R$, as shown by arrow 6 would be equal to MB(MI)I. If the light is incident upon non-linear absorber 4 from the right, the incident intensity I'=I. Upon passing through 4, the light intensity I is attenuated by the factor B. The output intensity of such beam after passing through linear amplifier 2 will be called I''$_L$ which is equal to MB(I)I. Since by assumption B(I) is unequal to B(MI), then I''$_R$ is unequal to I''$_L$. This factor can be used to employ the combined elements 2 and 4 of FIGURE 1 as a light diode.

In FIGURE 2, the linear amplifier 2 is shown as a D.C. biased GaAs laser 8. The GaAs laser 8 will comprise a P region and an N region separated by an active region A in which recombination takes place when the laser is biased in the forward direction by the battery 10. When a light beam 12 impinges on the biased diode 8 in the vicinity of the active region A, the light beam is amplified and emerges from the diode 8 as a beam of increased intensity 16. The non-linear absorber of light chosen to represent the element 4 of FIGURE 1 is a GaAs crystal 14 having a thickness of the order of 10 microns. The GaAs crystal 14, when exposed to an intense beam of light, is heated. This rapid rise in temperature causes the absorption constant of the GaAs to go up, resulting in a diminution in the intensity of the beam of light 16 when it exits as beam 18. When the intensity of beam 16 diminishes, its heating effect upon GaAs crystal 14 also diminishes, resulting in a decrease in the absorption coefficient of the GaAs crystal 14.

CHART 1

| $L_{in}$ | $L_{out}$ |
|---|---|
| 0.5 | .05 |
| 1 | 0.1 |
| 10 | 0.2 |
| 20 | 0.3 |
| 40 | 0.4 |

Chart 1 shows by way of example what is meant by a non-linear absorber. The beam 16 is called $L_{in}$ and beam 18 is referred to as $L_{out}$. Assume that the linear amplifier 8 has an amplification factor of 20. If a beam of light that impinges upon the left side of the active region A of the diode 8 has an intensity of 0.5 unit, then the output beam 16 would have an intensity of 10 units. From Chart 1 it can be seen that an input of 10 units into the GaAs crystal 14 would result in an output of 0.2 unit. Assume that the original 0.5 unit of light intensity is now applied to the right side of non-linear GaAs absorber. Then the light impinging upon the right side of the I region of diode 8 will be 0.05 unit of light intensity. The 0.05 unit of light, after passing through the linear amplifier 8, will be amplified by a factor of 20 and will now exit from the left side of the I region of the diode 8 with an intensity of 1.0 unit. Thus, it is seen that when 0.5 unit of intensity appears to the left side of the combination comprising diode 8 and non-linear absorber 14, an output of 0.2 unit of lihgt intensity appears on the right side of non-linear absorber 14. On the other hand, if the same source of light of 0.5 unit of intensity impinges upon the right side of the non-linear absorber 14 then 1.0 unit of intensity of light exits from diode 8. There is thus a discrimination factor of 5 to 1 and the combination shown in FIGURE 2 behaves as a light diode.

Although only one type of non-linear absorber of light has been shown, other materials may be used as set forth in applicant's published article entitled, "Non-Linear Absorbers of Light" which appeared in the IBM Journal of Research and Development, October 1963, vol. 7, No. 4, pages 334–336. In such article it is indicated that the non-linear absorber need not be one whose absorptivity changes due to the conversion of absorbed light into heat but could be one wherein the absorbed light serves to vary the energy levels of electrons within the absorbing medium, and such changes in energy levels serve to alter the optical density of the non-linear absorber. For example, the GaAs non-linear absorber 14 could be replaced with a light transparent container of dyes and/or chemicals that exhibit such non-linear absorption characteristics. One such replacement would be a photochromic compound such as 2-(2,4-dinitrobenzyl) pyridine wherein the impinging light upon such compound causes the latter to discolor so as to diminish the light transmittance of the photochromic compound. An article entitled, "Photochromism" by George Dorion and Leonard Weissbein, appearing on pages 32–35 in the February 1963 issue of "Discovery" noted that most such chemical non-linear absorbers of light have a common basis in that they involve bistable atoms or molecules capable of "switching" between two distinct states, representing different atomic, molecular or electronic configurations. Alterations to the electronic orbital structure of the selected compound that accompany atomic or molecular changes lead to spectral shifts within or between the ultraviolet or visible regions, thus, changes in absorptivity with light intensity.

In FIGURE 3, the linear amplifier 8 and non-linear absorber 14 have their output beam 13 impinging upon a light utilization device 15. In a similar manner another light diode comprising linear amplifier 8' and non-linear absorber 14' has its output light 17 impinge upon the light utilization device 15. Such light utilization device 15 could be a laser wherein the presence of only one output, either 13 or 17, will be insufficient to quench the laser 15 out of lasing but the presence of both outputs 13 and 17 appearing simultaneously on laser 15 would be sufficient to quench the laser. The presence of such coincident light pulses would be manifested by an absence of an intense pulse of light 19 emanating from a window of the laser 15. The two light diodes, each of which is formed by a linear amplifier and a non-linear absorber of light, would be housed in a suitable light-tight housing 20, if operation of the light diodes takes place under conditions where ambient light will be interfere with the operation of such light diodes.

While the invention has been particularly shown and described with reference to preferred embodiments thereof, it will be understood by those skilled in the art that various changes in form and details may be made therein without departing from the spirit and scope of the invention.

What is claimed is:
1. A light diode comprising a linear amplifier of light and a non-linear absorber element of light, the latter being in light conductivity relationship with said linear amplifier of light and having no electrical energy applied thereto to alter its absorptive characteristics, and means for sending light in opposite directions through said light diode.
2. The light diode of claim 1 wherein said linear amplifier of light consists of a forward-biased PN electroluminescent diode laser.
3. A light diode as defined in claim 2 wherein said non-linear absorber of light consists of a GaAs crystal.
4. A light diode comprising a linear amplifier of light, a non-linear absorber of light disposed adjacent to and in light conducting relationship to said linear amplifier, and means for sending light through either side of said light diode so as to obtain a light output intensity as a function of the direction through said diode of said light transmitted therethrough.
5. The light diode of claim 4 wherein said linear amplifier is a forward-biased PN electroluminescent diode laser and said non-linear absorber consists of a GaAs crystal.
6. The light diode of claim 4 wherein said non-linear absorber is a photochromic compound 2-(2,4-dinitrobenzyl) pyridine.

References Cited by the Examiner
UNITED STATES PATENTS
3,040,178  6/1962  Lyman et al. _____ 307—88.5

OTHER REFERENCES

"Infrared and Visible Light Emission from Forward-biased P-N Junctions" by Rediker et al. Solid State Design, August 1963 pp. 19–28.

Light Modulation With Piezoelectric Crystals, Electronic Industries, November 1962, pp. 90–95.

"Piezoelectric Optical-Maser Modulator" by Johnson et al., Journal of Applied Physics, vol. 33, No. 12, December 1962, pp. 3440–3443.

ROY LAKE, *Primary Examiner.*

ARTHUR GAUSS, *Examiner.*

B. P. DAVIS, D. HOSTETTER, *Assistant Examiners.*